(12) United States Patent
Sadeh et al.

(10) Patent No.: US 10,402,196 B2
(45) Date of Patent: Sep. 3, 2019

(54) MULTI-DIMENSIONAL SLIDING WINDOW OPERATION FOR A VECTOR PROCESSOR, INCLUDING DIVIDING A FILTER INTO A PLURALITY OF PATTERNS FOR SELECTING DATA ELEMENTS FROM A PLURALITY OF INPUT REGISTERS AND PERFORMING CALCULATIONS IN PARALLEL USING GROUPS OF THE DATA ELEMENTS AND COEFFICIENTS

(71) Applicant: Ceva D.S.P. Ltd., Herzlia Pituach (IL)

(72) Inventors: Roni M. Sadeh, Kfar Saba (IL); Noam Dvoretzki, Hod HaSharon (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 193 days.

(21) Appl. No.: 14/708,767

(22) Filed: May 11, 2015

(65) Prior Publication Data

US 2016/0335082 A1 Nov. 17, 2016

(51) Int. Cl.
*G06F 9/30* (2018.01)

(52) U.S. Cl.
CPC .......... *G06F 9/3001* (2013.01); *G06F 9/3013* (2013.01); *G06F 9/30032* (2013.01); *G06F 9/30036* (2013.01)

(58) Field of Classification Search
CPC ............ G06F 9/3001; G06F 9/30032; G06F 9/30036; G06F 9/3013; G06F 9/3018
USPC ....................................................... 712/222
See application file for complete search history.

(56) References Cited

U.S. PATENT DOCUMENTS

| 5,696,954 A | 12/1997 | Guttag et al. |
|---|---|---|
| 7,694,078 B2 | 4/2010 | Setheraman et al. |
| 2002/0135586 A1* | 9/2002 | Sandford ............ G06F 12/0623 345/543 |
| 2006/0034368 A1* | 2/2006 | Klivington ............. H04N 19/60 375/240.2 |
| 2011/0072236 A1* | 3/2011 | Mimar .................. G06F 9/3001 712/4 |

OTHER PUBLICATIONS

European Search Report of European Application No. EP 16 16 8805 dated Oct. 31, 2016.

(Continued)

*Primary Examiner* — Aimee Li
*Assistant Examiner* — Shawn Doman
(74) *Attorney, Agent, or Firm* — Pearl Cohen Zedek Latzer Baratz LLP (57) ABSTRACT

A logic circuit in a processor including a plurality of input registers, each for storing a vector containing data elements, a coefficient register for storing a vector containing N coefficients, an output register for storing a result vector, and an arithmetic unit configured to: obtain a pattern for selecting N data elements from the plurality of input registers, select a plurality of groups of N data elements from the plurality of input registers in parallel, wherein each group is selected in accordance with the pattern, and wherein each group is shifted with respect to a previous selected group, perform an arithmetic operation between each of the selected groups and the coefficients in parallel, and store results of the arithmetic operations in the output register.

17 Claims, 7 Drawing Sheets

(56) References Cited

OTHER PUBLICATIONS

Moore et al., "Adaptable Two-Dimension Sliding Windows on NVIDIA GPUs with Runtime Compilation", IEEE, Symposium on Application Accelerators in High-Performance Computing (SAAHPC), pp. 103-112, Jul. 19-21, 2011.
Office Action of Application No. EP16168805.6 dated Oct. 25, 2018.

* cited by examiner

| P(0,0) | P(0,1) | P(0,2) | ··· | ··· | P(0,L-1) |
|---|---|---|---|---|---|
| P(1,0) | P(1,1) | P(1,2) | ··· | ··· | P(1,L-1) |
| ⋮ | | | | | ⋮ |
| P(K-1,0) | P(K-1,1) | P(K-1,2) | ··· | ··· | P(K-1,L-1) |

Fig. 3A

| P(0,0) | P(0,1) | P(0,2) | P(0,3) | ··· | P(0,L-1) |
|---|---|---|---|---|---|
| P(1,0) | P(1,1) | P(1,2) | P(1,3) | ··· | P(1,L-1) |
| ⋮ | | | | | ⋮ |
| P(K-1,0) | P(K-1,1) | P(K-1,2) | P(K-1,3) | ··· | P(K-1,L-1) |

Fig. 3B

| P(0,0) | P(0,1) | P(0,2) | P(0,3) | P(0,4) | ··· | P(0,L-1) |
|---|---|---|---|---|---|---|
| P(1,0) | P(1,1) | P(1,2) | P(1,3) | P(1,4) | ··· | P(1,L-1) |
| ⋮ | | | | | | ⋮ |
| P(K-1,0) | P(K-1,1) | P(K-1,2) | P(K-1,3) | P(K-1,4) | ··· | P(K-1,L-1) |

MULTI-DIMENSIONAL SLIDING WINDOW OPERATION FOR A VECTOR PROCESSOR, INCLUDING DIVIDING A FILTER INTO A PLURALITY OF PATTERNS FOR SELECTING DATA ELEMENTS FROM A PLURALITY OF INPUT REGISTERS AND PERFORMING CALCULATIONS IN PARALLEL USING GROUPS OF THE DATA ELEMENTS AND COEFFICIENTS

FIELD OF THE INVENTION

The present invention relates generally to the field of vector processor architecture, and more particularly, to a multi-dimensional sliding window instruction implementation for vector processor architecture.

BACKGROUND

Sliding window operations are widely used in image processing. Some relevant algorithms that make use of sliding window operations include Harris Corner Detector, two-dimensional (2D) correlation, 2D convolution, Gaussian Filter, Kanade-Lucas-Tomasi (KLT) feature tracker, Nagao Matsuyama filter, algorithms that require the sum of absolute differences and Sobel Filter. For most sliding window operations, processing high resolution images is computationally intensive.

Vector processors typically include a plurality of vector registers designed to be used as input and/or output registers for a variety of vector type instructions. Vector processors typically enable performing operations between corresponding data elements of e.g., two input registers in parallel, thus providing increased efficiency through parallelism. Thus, vector processors may significantly increase the speed of image processing of high resolution images.

SUMMARY OF THE INVENTION

According to embodiments of the present invention, there is provided a logic circuit in a processor. The logic circuit may include a plurality of input registers, each for storing an input vector containing data elements; a coefficient register for storing a coefficient vector containing N coefficients; an output register for storing a result vector; and an arithmetic unit configured to: receive a pattern for selecting N data elements from the plurality of input registers; select a plurality of groups of N data elements from the plurality of input registers in parallel, wherein each group is selected in accordance with the pattern, and wherein each group is shifted with respect to a previous selected group; perform an arithmetic operation between each of the selected groups and the coefficients in parallel; and store results of the arithmetic operations in the output register. According to embodiments of the present invention, the logic circuit may be configured to receive the pattern, the input vectors and the coefficients from a dedicated instruction.

According to embodiments of the present invention, there is provided a system, the system may include: a program memory; a processor configured to receive from the program memory an instruction to execute a configurable sliding window operation, the instruction may include a coefficient vector containing N coefficients, a plurality of input vectors containing data elements, and a pattern for selecting N data elements from the plurality of input vectors, the processor may include: a plurality of input registers, each for storing an input vector; a coefficient register for storing the coefficient vector; an output register for storing a result vector; and an arithmetic unit configured to execute the instruction by: receiving the pattern; selecting a plurality of groups of N data elements from the plurality of input vectors in parallel, wherein each group is selected in accordance with the pattern, and wherein each group is shifted with respect to a previous selected group; performing an arithmetic operation between each of the selected groups and the coefficients in parallel; and storing results of the arithmetic operations in the output register and/or returning the results of the arithmetic operations as an output vector.

Furthermore, according to embodiments of the present invention, the arithmetic unit may include a plurality of blocks, wherein each block is adapted to perform the arithmetic operation between one of the selected groups and the coefficients, wherein each block may include: N multipliers configured to multiply each one of the N data elements by a corresponding coefficient; N adders configured to sum results of the multipliers; and an additional adder configured to add a stored result of the arithmetic operation with the sum. According to embodiments of the present invention N may be 4 or larger.

Furthermore, according to embodiments of the present invention, the arithmetic operation may include multiplication, absolute difference and subtraction.

According to embodiments of the present invention, there is provided a method for performing sliding window operation by a processor, which may include: (a) obtaining a pattern for selecting N data elements from a plurality of input vectors stored in a plurality of input registers; (b) selecting a plurality of groups of N data elements from the plurality of input registers in parallel, wherein each group is selected in accordance with the pattern, and wherein each group is shifted with respect to each other; (c) performing an arithmetic operation between each of the selected groups and a plurality of coefficients in parallel; and (d) storing the results of the arithmetic operations in an output register.

Furthermore, according to embodiments of the present invention, the method may include: dividing a two dimensional filter into a plurality of patterns; and repeating steps a-d for each of the patterns. According to embodiments of the present invention, null coefficients of the filter are substantially not included in the patterns.

Furthermore, according to embodiments of the present invention, the method may include: dividing a multi-dimensional filter into a plurality of patterns; and repeating steps a-d for each of the patterns. According to embodiments of the present invention, null coefficients of the filter are substantially not included in the patterns.

Furthermore, according to embodiments of the present invention, performing the arithmetic operation may include: multiplying each one of the N data elements by a corresponding coefficient; summing results of the multiplication; and adding a stored result of the arithmetic operation to the sum.

Furthermore, according to embodiments of the present invention, the method may include: receiving a dedicated instruction, the instruction providing the pattern, the input vectors and the coefficients.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide a method for performing a configurable sliding window operation by a logic circuit of a vector processor. Embodiments of the present invention may provide enhanced parallelism and efficient hardware utilization. Performing a sliding-window operation according to embodiments of the present invention may enable efficient data reuse since the same vectors may be accessed multiple times. This may lead to reduced memory accesses and lower power consumption. Kernels that contain overlapping input data elements may utilize the sliding-window operation to increase performance. A configurable sliding-window operation may provide flexibility that may enable efficient implementation of any required one-dimensional (1D), 2D or higher dimension filters. Exemplary algorithms that may use the configurable sliding window operation include Harris Corner Detector, 2D correlation, 2D convolution, Gaussian Filter, Kanade-Lucas-Tomasi (KLT) feature tracker, Nagao Matsuyama filter, algorithms that require the sum of absolute differences, Sobel Filter, etc. As used herein, vector may refer to a 1D array of data items.

As used herein a sliding window operation may refer to a performing an operation on a selection or a "window" of data elements of a data set and moving, shifting or sliding the window across the data elements of a data set, each time performing the operation on the selected data. The movement of the window may be virtual, or a data construct. For example, a sliding window operation may include sliding the window across an array of data elements, at a raster scan. As used herein, a cycle of the sliding window operation includes sliding the window and performing the operation substantially across the entire data set. As used herein a configurable sliding window operation may refer to performing a sliding window operation in which the selection of data elements is not fixed, and may be configured or controlled by a user. For example, data elements may be selected according to a pattern, as disclosed herein. According to some embodiments, the pattern may be provided as an input parameter of a dedicated and configurable sliding window instruction.

Embodiments of the present invention may be utilized for filtering uncompressed image data. For multi-dimensional uncompressed video or image data, each data element may have a value uniquely associated with a single pixel in an image or video frame. For example, a data element may refer to a single pixel value or pixel component value (for example, a YUV or RGB color model value) in a single image frame. Embodiments of the present invention, however, are not limited to image processing and data elements may represent any desired quantity.

Figure 1:
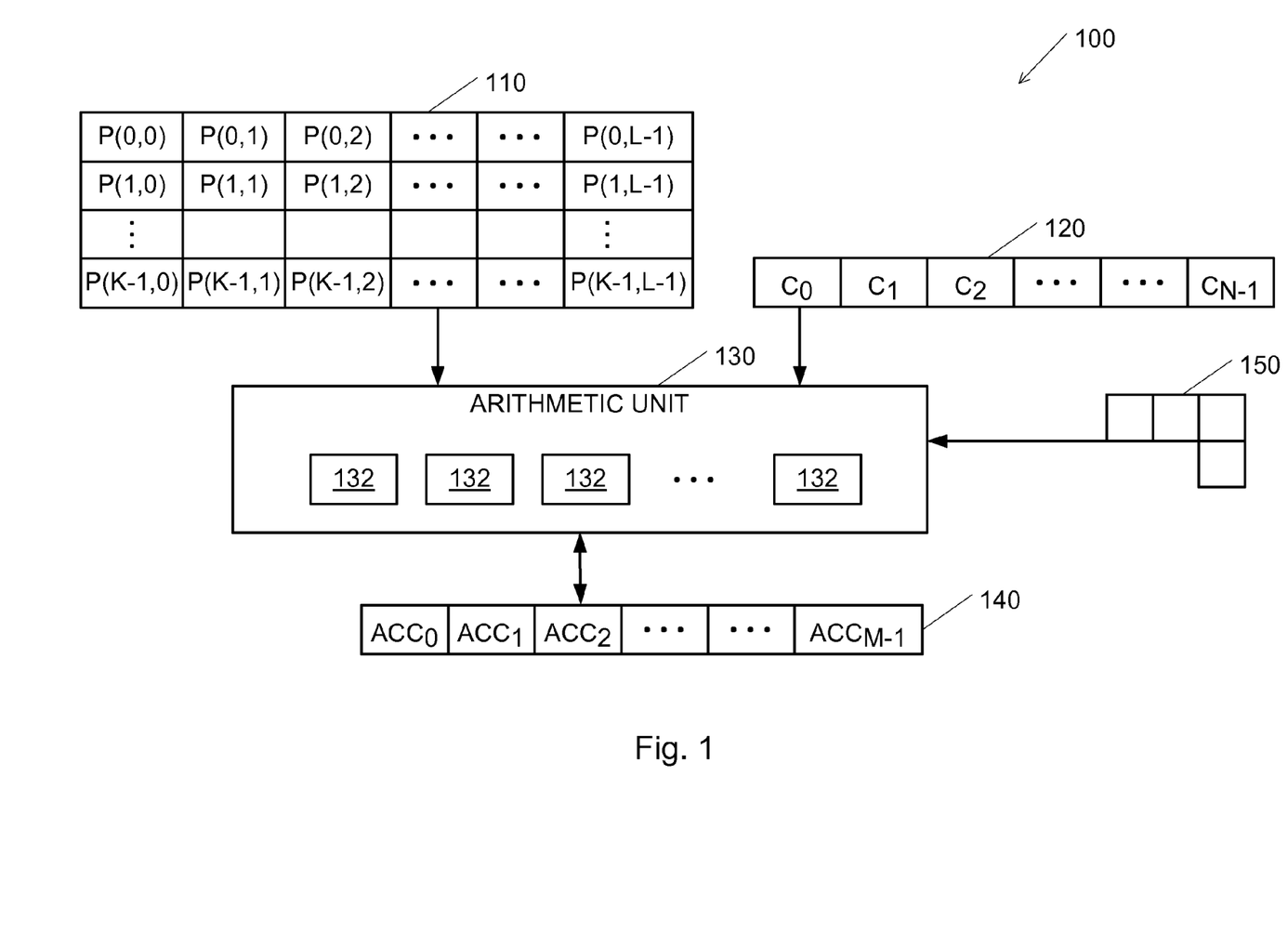
FIG. 1 is a schematic block diagram of a hardware unit in a processing system for performing a sliding window operation according to embodiments of the present invention.

Reference is now made to FIG. 1, which is a schematic block diagram of a hardware unit in a processing system for performing a sliding window operation according to embodiments of the present invention. An exemplary hardware unit 100 may include input registers 110, a coefficient register 120, an arithmetic unit 130 and an output register 140. Each one of the blocks in FIG. 1, e.g., input registers 110, coefficient register 120, arithmetic unit 130 and output register 140 may be logic circuits and/or memories, interconnected and configured to, e.g., include combinational and sequential logic capable of or designed to, perform the operations described herein. As would be realized by a person skilled in the art, the division into functional blocks is made for clarity of explanation. In practice, all or some of these blocks may reside in a single chip. In other embodiments, other arrangements of components and functional blocks and other components and functional blocks may be used. Hardware unit 100 may be a part of a processor or a vector processor (for example, processor 610 depicted in FIG. 6)

Figure 6:
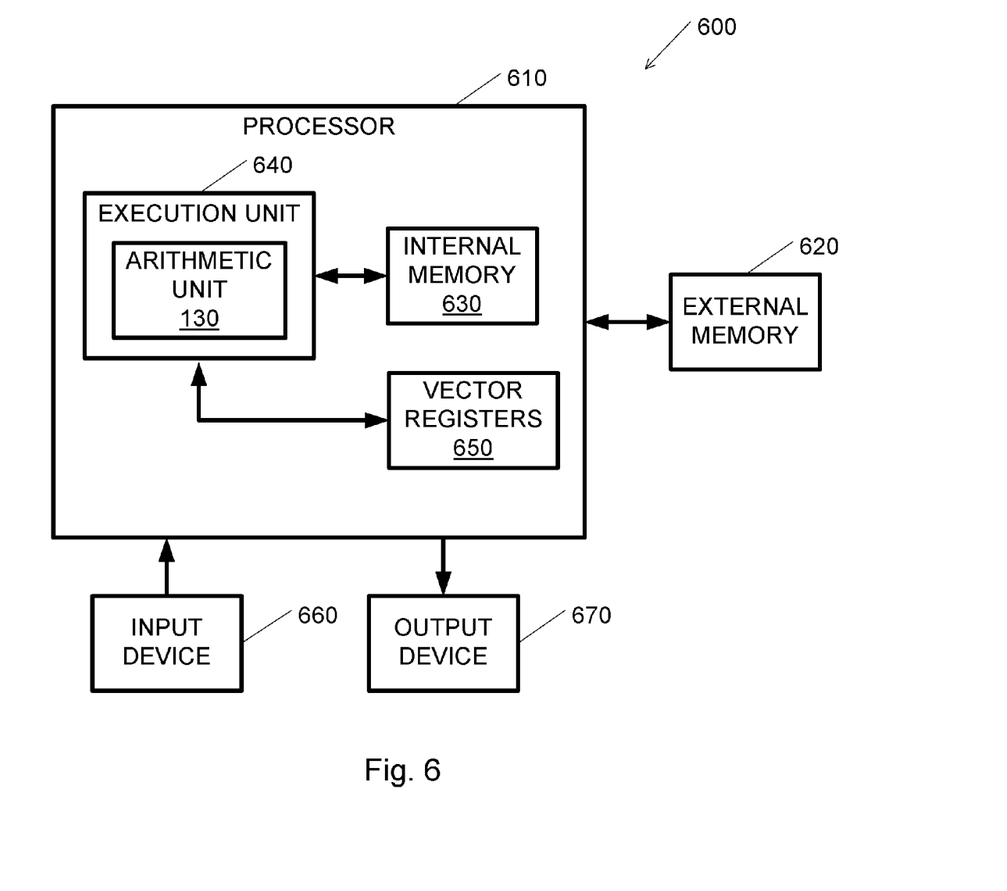
FIG. 6 is schematic illustration of an exemplary device according to embodiments of the invention.

Input registers 110 may receive input data from a memory unit (e.g., an internal memory or external memory shown in FIG. 6). The input data may be arranged, for example, as up to K input vectors, each including up to L data elements. The input vectors may represent pixels of an image or any other data. Data elements are represented as P(k,l), wherein k is an index of the vector number k=0, 1, . . . , K−1, and l is an index of the data element within a vector l=0, 1, . . . , L−1. Coefficient register 120 may store coefficient elements as a vector C containing up to N coefficients, $C_0, C_1 \ldots C_{N-1}$. The coefficient elements may be, for example, coefficients of a filter, of a convolution or of part of a filter or convolution. Arithmetic unit 130 may include a plurality of multipliers and adders and/or other hardware and logic circuits designed and configured to perform an arithmetic operation and to produce or output the results of the operation, e.g., a configurable sliding window operation, as will be described herein. Output register 140 may receive output results from arithmetic unit 130, for example as a vector containing up to M results $ACC_0, ACC_1 \ldots ACC_{M-1}$. Results of the arithmetic operations may be saved or stored in output register 140. K, L, M and N are integers larger than 1. Each data element in input registers 110, coefficient register 120 and output register 140 may include a data element of any desirable size or format, e.g., a single bit, byte, word, long word, integer, etc., as may be necessary to meet specific design requirements.

Arithmetic unit 130 may be configured to obtain a mask, also referred to as pattern, for example, pattern 150 for selecting groups of up to N data elements in a specific spatial pattern from input registers 110. Arithmetic unit 130 may be configured to receive or select, in parallel, a plurality of selected groups, each including N data elements from input registers 110. Each group may be selected in accordance with pattern 150 such that each group is shifted with respect to a previous group, for example, by a step of one data element or more, for example, in a raster scan. As used herein, shifted groups may relate to groups in which all corresponding data elements of the two groups are displaced by a constant value with respect to each other. Arithmetic unit 130 may be configured or adapted to perform, in parallel, an arithmetic operation between data elements of each of the selected groups and the coefficients from coefficient register 120 and to store results of the arithmetic operations in output register 140. In some embodiments, arithmetic unit 130 may be configured to obtain results stored in output register 140 as input for a subsequent calculation. For example, the results of the arithmetic operation may be added to the result values of a previous operation stored in output register 140.

Pattern 150 may define a relative location or displacement of the N data elements with respect to a starting point in input registers 110. For example, pattern 150 may be provided to arithmetic unit 130 in the form of a bit mask containing, for example, "1"s in the selected vector element locations to be processed, with relation to a known frame, and "0"s in other locations.

Figure 2A:
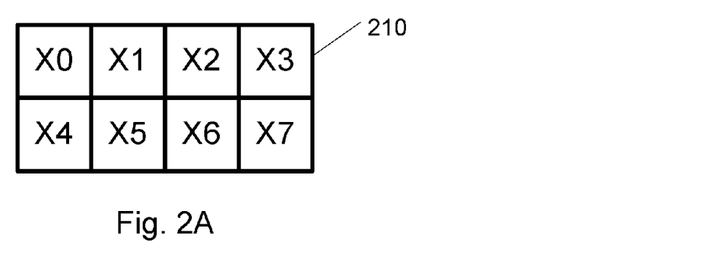
FIG. 2A depicts an exemplary frame helpful in understanding embodiments of the present invention.
Figure 2B:
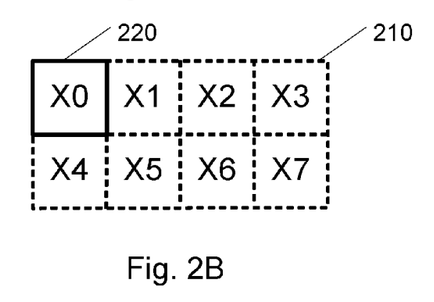
FIGS. 2B-2G depict possible patterns implemented in embodiments of the present invention.
Figure 2C:
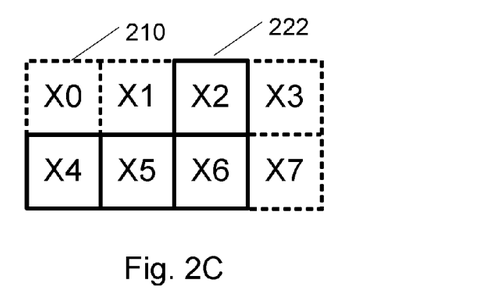
Figure 2D:
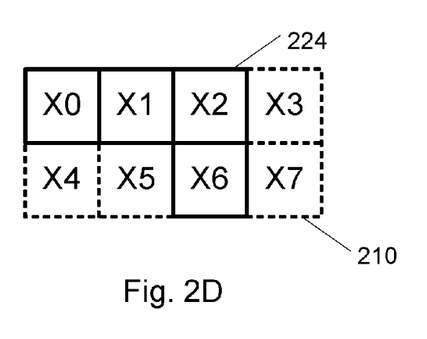
Figure 2E:
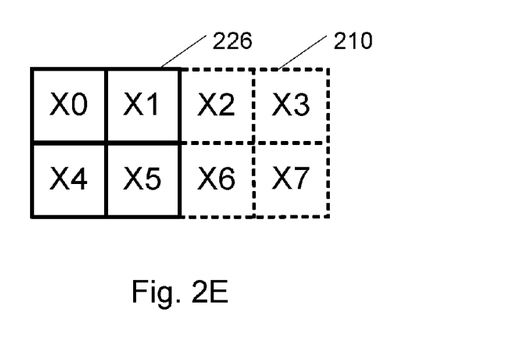
Figure 2F:
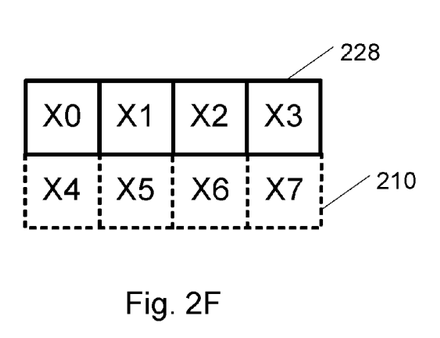
Figure 2G:
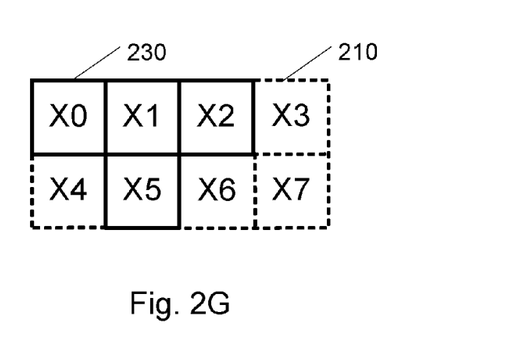

Reference is now made to FIG. 2A depicting an exemplary frame and to FIGS. 2B-2G depicting possible patterns according to embodiments of the present invention. For example, frame 210 may include a total of eight data elements marked X0-X7. Bits X0-X3 may correspond with four consecutive data elements of a first input vector with indexes that depend on the location of the window, while bits X4-X7 may correspond with four consecutive data elements, with the same indexes, of a second input vector. Exemplary patterns 220, 222, 224, 226, 228, 230 may each include a number of one or more data elements (between 1 and 8), indicating which data elements are included in the pattern. The values of bits X0-X7 in the bit mask may indicate if the corresponding data element is included in the pattern or not. For example, a value of "1" may indicate that the corresponding data element is included in the pattern and a value of "0" may indicate that the corresponding data element is not included in the pattern. For example, pattern 220 may be represented by bit mask "10000000", pattern 222 may be represented by bit mask "00101110", pattern 224 may be represented by bit mask "11100010", pattern 226 may be represented by bit mask "11001100", pattern 228 may be represented by bit mask "11110000", and pattern 230 may be represented by bit mask "11100100". Other frames and patterns may be defined, as well as other forms of providing the pattern to arithmetic unit 130. For example, the frame may include other number of data elements, taken from other number of input vectors.

Returning to FIG. 1, arithmetic unit 130 may include a plurality of computational units or blocks 132, for example, up to M blocks 132. Each block may be adapted to or configured to, e.g., include combinational and sequential logic capable of or designed to, perform the arithmetic operation between one of the selected groups and the coefficients from coefficient register 120. The number of blocks 132 may equal the number of results saved in output register 140. Arithmetic unit 130 may be configured to, e.g., include combinational and sequential logic capable of or designed to, receive the pattern for selecting N data elements from the plurality of input registers, select and receive, in parallel, a plurality of groups, each including up to N data elements from input registers 110, and each is selected in accordance with pattern 150 and shifted with respect to or relative to a previous selected group, for example, shifted by a step of one data element or more. According to some exemplary embodiments, arithmetic unit 130 may include sixteen (16) blocks 132 for processing sixteen (16) groups of four (4) data elements. According to other exemplary embodiments, arithmetic unit 130 may include thirty two (32) blocks 132 for processing thirty two (32) groups of two (2) data elements. Arithmetic unit 130 may include other numbers of blocks for processing other group sizes, as supported by the specific capabilities of arithmetic unit 130.

Figure 3A:
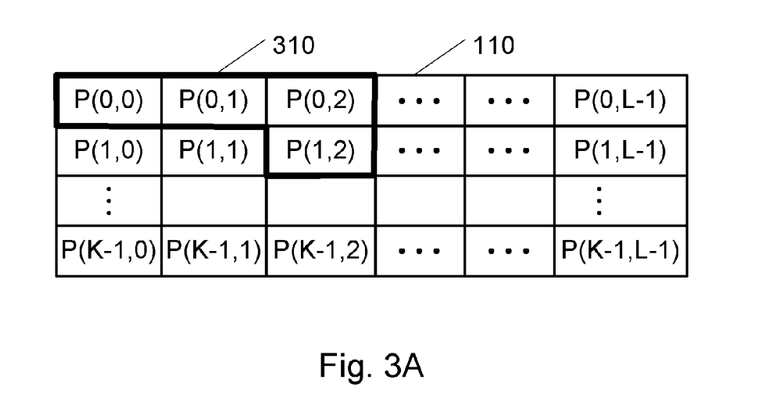
FIGS. 3A-3C depict respective groups for an exemplary bit mask "11100010" according to embodiments of the present invention.
Figure 3B:
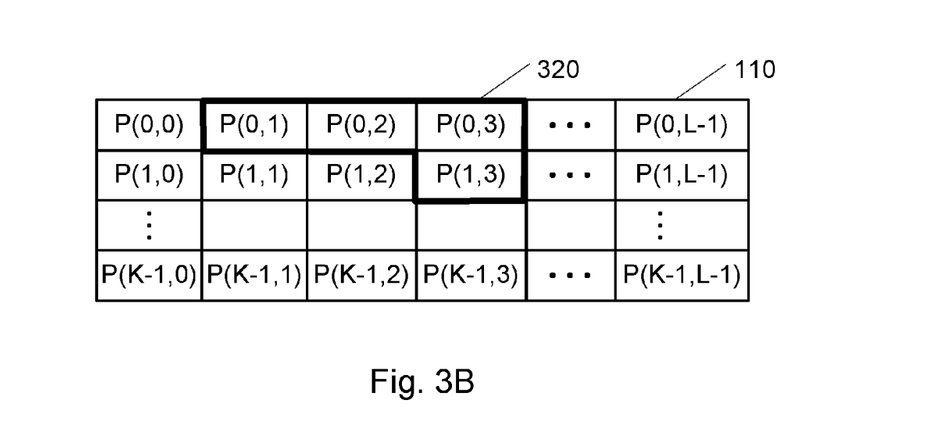
Figure 3C:
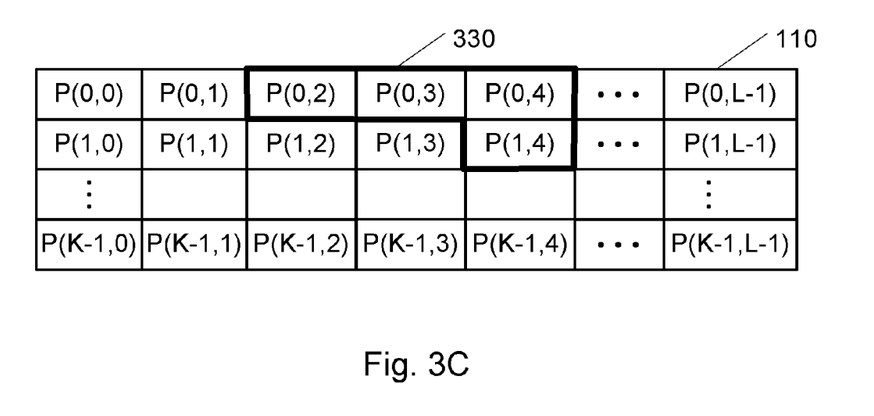

Reference is now made to FIGS. 3A-3C depicting three one data element shifted groups for example bit mask "11100010" (corresponding to pattern 224 of FIG. 2D, defined relatively to frame 210), according to embodiments of the present invention. For example, three one data element shifted groups may be three of the groups selected by arithmetic unit 130 as described herein. In case arithmetic unit 130 receives bit mask "11100010", the data elements selected for the first group, marked 310 in FIG. 3A, would be P(0,0), P(0,1), P(0,2) and P(1,2). A second one data element shifted group, marked 320 in FIG. 3B, would be P(0,1), P(0,2), P(0,3) and P(1,3). A third one data element shifted group, marked 330 in FIG. 3C, would be P(0,2), P(0,3), P(0,4) and P(1,3), and so on in a raster scan. It should be noted that near the edges of input registers 110, where there are not enough data elements for a pattern, padding may be used as known in the art. A total of up to M groups may be selected in parallel. Arithmetic unit 130 may perform the arithmetic operation between data elements of each one of the selected groups and the coefficients from coefficient register 120, and optionally add the result to a result value stored in output register 140. While the example depicted in FIGS. 3A-3C shows three one data element shifted groups, the selected groups may be shifted by more than one data element, or in other directions.

Examples for arithmetic operations may include any combination of multiplication, addition, absolute difference and subtraction, or any other mathematical or logical operation or a combination of operations. Examples for arithmetic operations are given below.

For example, blocks 132 may perform the following example operation:

$$ACC_i += C_0 * P_{i(a)} + C_1 * P_{i(b)} + C_2 * P_{i(c)} + \ldots + C_{N-1} * P_{i(d)} \quad \text{(equation 1)}$$

where i is an index of the group number i=0, 1, ..., M-1, which may indicate both the starting point of each group within input vectors 110 and the index of the result, ACC, within result vector 140. The letters a, b, c, and d represent the relative displacement of each data element P with respect to the starting point of the group. Data elements P may be selected from any one of input vectors 110 according to the bit mask, for example pattern 150. The sign += indicates that the result of the right hand side of the equation is added to a previous value of the left hand side of the equation. To perform the operation of equation 1 for a group of N data elements, each block 132 of arithmetic unit 130 may include N multipliers configured to multiply each one of the N data elements by a corresponding coefficient, N adders configured to sum results of the multipliers, and an additional adder configured to add a stored result of the arithmetic operation with the sum. It should be noted that while it is desirable to use all N multipliers and adders of arithmetic unit 130, in some cases a group may include less than N data elements. In this case not all multipliers and adders of arithmetic unit 130 may be used.

Implementing equation 1 for bit mask "11100010" (corresponding to pattern 224, FIG. 2D) in a raster scan would yield:

$$ACC_i += C_0 * P_{(0,i+0)} + C_1 * P_{(0,i+2)} + C_3 * P_{(1,i+2)} \quad \text{(equation 2)}$$

Although embodiments of the present invention were demonstrated with relation to a 2D vector array, this is not limiting. It should be readily understood that embodiments of the present invention may receive three-dimensional (3D) or higher dimensional arrays as input and 3D or higher dimensional patterns, for example, to perform higher dimensional filtering. According to embodiments of the invention, the input vectors and pattern may represent a dataset of any desired dimension.

Additionally, according to some embodiments of the present invention, the bit mask may be eliminated and arithmetic unit 130 may select data elements for the plurality of groups according to a predetermined pattern, for example, N consecutive data elements of a single input vector may be selected. In this case, referred to herein as a fixed single-row sliding window, an example of equation 1 may be:

$$ACC_i += C_0 * P_{(i+0)} + C_1 * P_{(i+1)} + C_2 * P_{(i+2)} + \ldots + C_{N-1} * P_{(i+N-1)} \quad \text{(equation 3)}$$

For example, for N=4 equation 3 may be:

$$ACC_i += C_0 * P_{(i+0)} + C_1 * P_{(i+1)} + C_2 * P_{(i+2)} + C_3 * P_{(i+3)} \quad \text{(equation 4)}$$

Selecting N consecutive data elements may be very efficient if the number of coefficients of a row of a filter equals N or a multiplication of N. If the number of coefficients of a row of a filter, however, does not equal a multiplication of N, hardware utilization may not be optimal. Arithmetic unit 130 may include sufficient hardware to support parallel processing of M groups (M being the number of output data elements in output register), each group having N data elements (N being the number of coefficients in the coefficient register). If a row of a filter includes N or a multiplication of N coefficients, then in each cycle M groups of N data elements may be selected and processed utilizing all available hardware. However, if a row of the filter includes a number of coefficients that is not a multiplication of N, then at some point, M groups of less than N data elements may be selected and processed utilizing only a part of the available hardware. Similar problems may occur in cases were some of the filter coefficients are null (e.g., equal zero), for example in Sparse filters, as will be discussed herein.

Figure 4A:
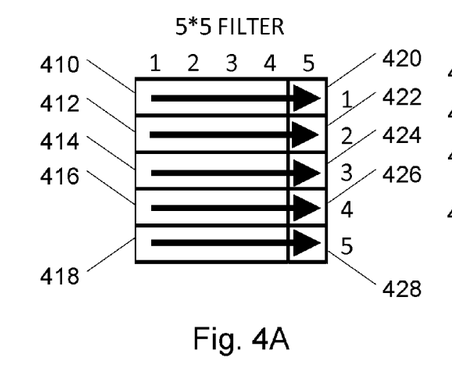
FIG. 4A depicts an exemplary two-dimensional (2D) 5*5 filter implemented with fixed single-row sliding window operations of four consecutive data elements according to embodiments of the present invention.
Figure 4B:
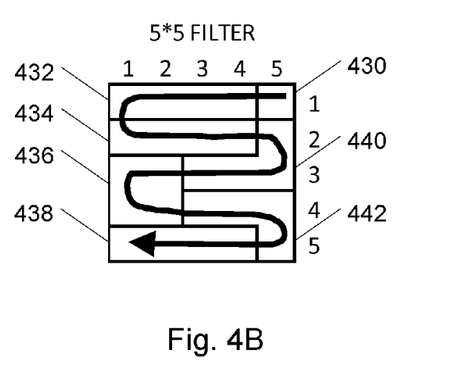
FIG. 4B depicts an exemplary 2D 5*5 filter implemented with configurable sliding window operations using a variety of patterns according to embodiments of the present invention.

Reference is now made to FIG. 4A depicting an exemplary two-dimensional (2D) 5*5 filter implemented with fixed single-row sliding window operations of four consecutive data elements and to FIG. 4B depicting an exemplary 2D 5*5 filter implemented with configurable sliding window operations using a variety of patterns (e.g, patterns 228, 220, 222, 224 and 226 depicted in FIGS. 2F, 2B, 2C, 2D and 2E, respectively), according to embodiments of the present invention. Each rectangle represents a cycle of a sliding window operation that may be performed on the entire dataset, as described herein. When the filter is implemented by using fixed single-row sliding window operations as in FIG. 4A, ten (10) cycles of the sliding window operation are required. Five (5) cycles of a sliding window operation, e.g., cycles 410, 412, 414, 416 and 418 utilize all available hardware. However, in the other five (5) cycles, e.g. cycles 420, 422, 424, 426 and 428, only a single coefficient and a single data element are loaded and therefore only a fraction, e.g., about 25% of the hardware is utilized. Advantageously, as shown in FIG. 4B, when various patterns are used the calculation may require less cycles of the sliding window operation (e.g. 7 cycles). In the exemplary configuration of FIG. 4B, in six (6) cycles, e.g. cycles 432, 434, 436, 438, 440, 442, four (4) filter coefficients and four (4) data elements are analyzed. Only in a single cycle, e.g. cycle 430, a single data element is being analyzed. Thus, in all cycles except cycle 430 all available hardware is being utilized. Thus, the calculation includes only 7 cycles of the sliding window operation and is faster than the option presented in FIG. 4A.

Hardware utilization efficiency may be calculated as the relation between the theoretical minimal required number of multipliers for implementing a filter, e.g., derived from the size of the filter, and the total number of occupied multipliers (including multipliers that are not utilized) required for performing the filter. In the general case of a two dimensional filter, the increase in utilization efficiency of the configurable sliding window in comparison to fixed single-row sliding window may be calculated as follows. Assume a 2D filter in which:

Filter width (number of elements in a row): W
Filter height (number of rows): H
Processed elements per instruction: N (e.g., each block 132 of arithmetic unit 130 may include N multipliers).

The utilization efficiency of the configurable sliding window may equal:

$$\text{Efficiency} = \frac{W \cdot H}{\lceil W \cdot H / N \rceil \cdot N}$$

Where, ⌈ ⌉ represents the roundup operation. The utilization efficiency of a fixed single-row sliding window may equal:

$$\text{Efficiency} = \frac{W \cdot H}{\lceil W/N \rceil \cdot H \cdot N}$$

The 5×5 filter example presented in FIGS. 4A and 4B received hardware utilization efficiency of about 89% for the configurable sliding window and about 62% utilization for the single-row fixed sliding window. Thus, the configurable sliding window in this example achieves about 43% performance increase.

Figure 5A:
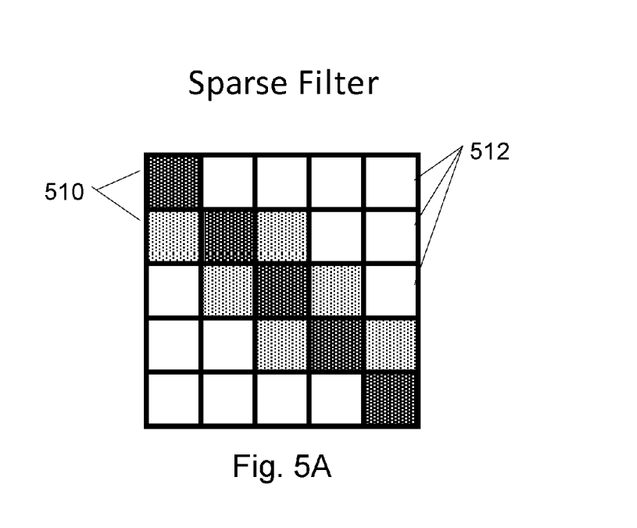
FIG. 5A depicts an exemplary Sparse filter.
Figure 5B:
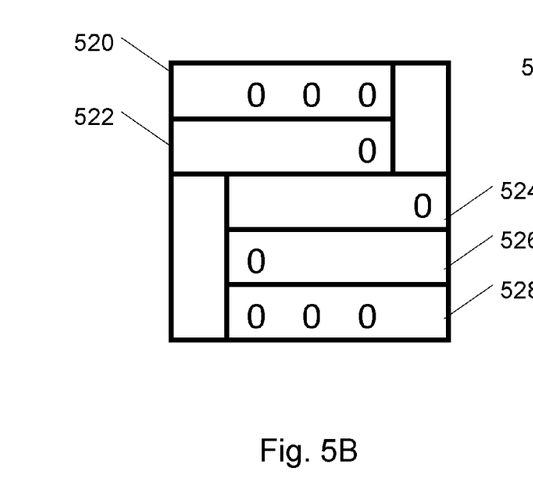
FIG. 5B depicts an implementation of the Sparse filter of FIG. 5A with fixed single-row sliding window operations of four (4) consecutive data elements according to embodiments of the present invention.
Figure 5C:
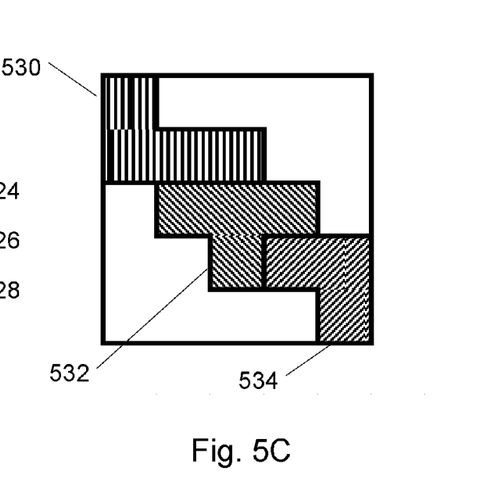
FIG. 5C depicts an implementation of the Sparse filter of FIG. 5A with configurable sliding window operations using a plurality of patterns according to embodiments of the present invention.

Reference is now made to FIG. 5A depicting an exemplary Sparse filter. Reference is made additionally to FIG. 5B depicting an implementation of the Sparse filter of FIG. 5A with fixed single-row sliding window operations of four (4) consecutive data elements and to FIG. 5C depicting an implementation of the Sparse filter of FIG. 5A with configurable sliding window operations using a plurality of patterns, according to embodiments of the present invention. Sparse filters are defined as filters that contain some coefficients that are null, e.g., equal to zero. Convolutional Neural Networks (CNN) algorithms and their derivatives make frequent use of sparse filters. 2D Sparse convolution in different sizes from 5×5 to 15×15 constitutes more than 90% of the cycles for these algorithms.

In FIG. 5A, the patterned boxes represent non-zero filter coefficients 510 and empty boxes represent null coefficients 512 of the exemplary Sparse filter. The Sparse filter presented in FIG. 5A includes 11 non-zero coefficients 510, illustrated as patterned boxes and 14 null coefficients, illustrated as empty boxes. When the Sparse filter is implemented by a single pattern of four (4) consecutive data elements as in FIG. 5B, five (5) sliding window cycles, for example, cycles 520, 522, 524, 526 and 528 may be required to perform the filtering. It can be seen that some of the coefficients, however, are null and therefore do not contribute to the calculation, decreasing hardware utilization. In this example, multiplier utilization equals about 55%. When configurable sliding window operations with various patterns are used according to embodiments of the invention, all or most of the null coefficients may be skipped, leading to higher utilization of available hardware and to more efficient and faster filtering. In the example of FIG. 5C, the patterns are arranged to cover only non-zero coefficients of the filter. As a result, multiplier utilization rises to about 95% and only three (3) sliding window cycles 530, 532 and 534 are required to perform the filtering. In most of cycles 530, 532 and 534, all four (4) filter coefficients and four (4) data elements are analyzed. Thus, more available hardware is being utilized in each cycle. Therefore, filtering is faster when using various patterns than when using a single pattern of consecutive elements. Filtering according to FIG. 5C is 60% faster than filtering according to FIG. 5B.

Reference is made to FIG. 6, which is schematic illustration of an exemplary device according to embodiments of the invention. A device 600 may include a computer device, video or image capture or playback device, cellular device, or any other digital device such as a cellular telephone, personal digital assistant (PDA), video game console, etc. Device 600 may include any device capable of executing a series of instructions, for example to process multi-dimensional data, such as, video, image, or audio data. Device 600 may include an input device 660 for providing multi-dimensional data and other input, and an output device 670 (for example, a monitor, projector, screen, printer, speakers, or display) for displaying multi-dimensional data such as video, image or audio data on a user interface according to a sequence of instructions executed by processor 610.

Device 600 may include a processor 610. Processor 610 may include or may be a vector processor, a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 600 may include an external memory unit 620 and an internal memory unit 630. Internal memory unit 630 may be a memory unit directly accessible to or internal to (physically attached or stored within) processor 610. Internal memory unit 630 may be a short-term memory unit, external memory unit 620 may be a long-term and/or short-term memory unit. Internal memory unit 630 and external memory unit 620 may include, for example, random access memory (RAM), dynamic RAM (DRAM), flash memory, cache memory, volatile memory, non-volatile memory or other suitable memory units or storage units. Internal memory unit 630 and external memory unit 620 may be implemented as separate (for example, "off-chip") or integrated (for example, "on-chip") memory units. For example, internal memory unit 630 may include a tightly-coupled memory (TCM), a buffer, or a cache, such as, an L-1 cache or an L-2 cache. Other or additional memory architectures may be used.

Processor 610 may include an execution unit 640. Execution unit 640 may include, for example, one or more arithmetic units 130. Processor 610 may request, retrieve, and process data from external memory unit 620 and/or internal memory unit 630, and may control, in general, the pipeline flow of operations or instructions executed on the data. Processor 610 may receive an instruction, for example, from a program memory (for example, in external memory unit 620 or internal memory 630) to filter a multi-dimensional data array. In one example, the instruction may filter or perform other operation on an image by sliding a window of coefficients of a filter over a multi-dimensional data array representing, for example, pixel values of a region of an image. According to embodiments of the present invention, processor 610 may receive an instruction to execute the sliding window operation described herein.

Processor 610 may include a plurality of individually addressable memory units, referred to as vector registers 650, for storing the multi-dimensional data. Vector registers 650, including, for example, vector registers such as input registers 110, coefficient register 120 and output register 140, may be internal to processor 610 and either internal/integrated with internal memory unit 630 or external/separate from internal memory unit 530. Processor 610 may transfer the data elements to a memory relatively more internal or accessible to the processor 610, for example, from external memory unit 620 to an internal memory unit 630 (such as a TCM), or from internal memory unit 630 to vector registers 650. When using vector registers 650, processor 610 may transfer an array of data elements to a plurality of vector registers 650, e.g., input registers 110, wherein each vector register may store a single row or part of a single row of the data array.

According to embodiments of the present invention, dedicated instructions may be used by a processor to execute the sliding window operation and the configurable sliding window operation described herein. For example, the dedicated instructions may provide as inputs the input vectors containing sequential data elements, the coefficients vector and the pattern, for example, as a bit mask. The instruction may return the results in the output register. Other instructions and input parameters may be used Implementing the configurable sliding window operation described herein as an instruction may provide a new level of flexibility for the user. Hence, the user may not only define the input vectors for a filtering operation, but also the vector or vectors elements that will be chosen for the sliding window operation. Thus, the user may use the configurable sliding window operation as a building block for efficiently implementing filters of diverse shapes and sizes.

Thus, processor 610 may be configured to receive, for example, from a program memory (e.g., in external memory unit 620 or internal memory 630), an instruction to execute a configurable sliding window operation according to embodiments of the present invention. The instruction may include a coefficient vector containing N coefficients, a plurality of input vectors containing data elements, and a pattern for selecting N data elements from the plurality of input vectors. Processor 610 may store the input vectors in a plurality of input registers 110 and the coefficient vector in coefficient register 120. Arithmetic unit 130 may configured to execute the instruction by receiving the pattern from the instruction, selecting a plurality of groups of N data elements from the plurality of input registers 110 in parallel and in accordance with the pattern, while each group is shifted with respect to a previous selected group, performing an arithmetic operation between each of the selected groups and the coefficients in parallel, and storing results of the arithmetic operations in output register 140. The instruction may return the results of the arithmetic operations as an output vector.

Figure 7:
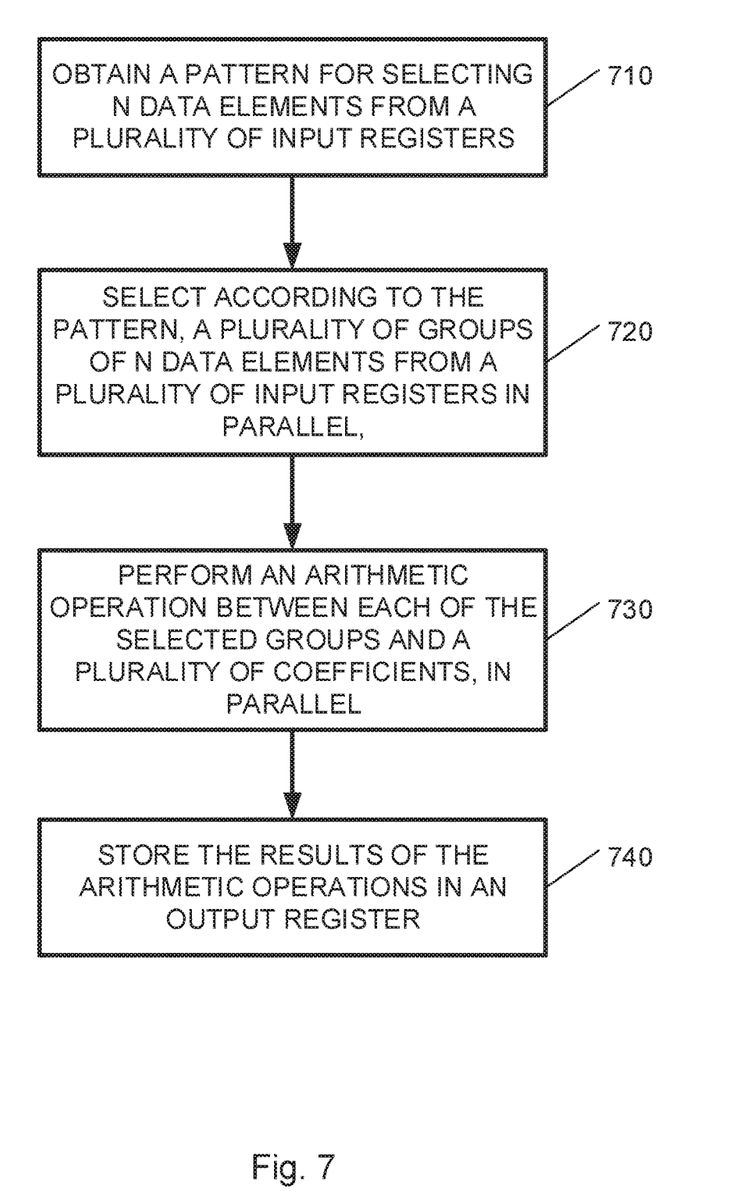
FIG. 7 is a flowchart diagram illustrating a method for performing a configurable sliding window operation in a vector processor in accordance with embodiments of the present invention.

Reference is now made to FIG. 7, which is a flowchart diagram illustrating a method for performing a configurable sliding window operation in a processor, in accordance with embodiments of the present invention. According to an embodiment, the method for performing configurable sliding window operation may be performed by any suitable processor, for example, processor 610 depicted in FIG. 6. In some embodiments the method for performing configurable sliding window operation may be initiated by a dedicated command or instruction. In operation 710, a pattern for selecting data elements (for example, N data elements) from a plurality of input registers may be obtained. The pattern may define relative location or displacement of the N data elements with respect to a starting point in the processed input vectors. In operation 720, a plurality of groups of data elements, for example, N data elements, may be selected in parallel from the plurality of input registers. According to embodiments of the invention, each group is selected in accordance with the pattern, and each group is shifted with respect to each other, for example, shifted by one data element or more in a raster scan. In operation 730, an arithmetic operation may be performed in parallel between each of the selected groups and a plurality of coefficients. According to some embodiments, the arithmetic operation may include multiplication, addition, absolute difference and subtraction, or any other mathematical or logical operation or a combination of operations. According to some embodiments, performing the arithmetic operation may include, for each group: multiplying each one of the data elements of a group by a corresponding coefficient, summing the results of the multiplication and adding a stored result of the arithmetic operation to the sum. In operation 740, the results of the arithmetic operations may be stored in an output register.

Figure 8:
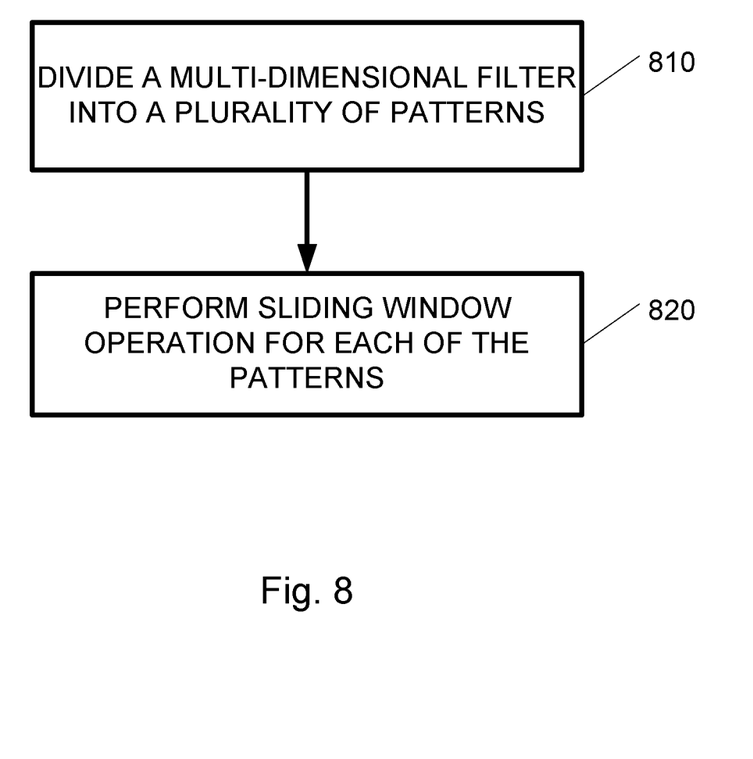
FIG. 8 is a flowchart diagram illustrating a method for performing filter operation using the configurable sliding window operation in accordance with embodiments of the present invention.

Reference is now made to FIG. 8 which is a flowchart diagram illustrating a method for performing filter operation using the configurable sliding window operation in accordance with embodiments of the present invention. According to some embodiments, the method for performing filter operation using the configurable sliding window operation may be performed by any suitable processor, for example, processor 610 depicted in FIG. 6. In some embodiments the method for performing filter operation using the configurable sliding window operation may be implemented as a series of commands, each for performing a configurable sliding window operation as described herein. In operation 810, a multi-dimensional filter may be divided into a plurality of patterns. In some applications, the multi-dimensional filter may be a two-dimensional (2D) filter. According to some embodiments of the present invention, null coefficients of the filter may substantially not be included in the patterns. In operation 820, the configurable sliding window operation may be performed for each of the patterns.

While being especially beneficial for image processing and communication systems, the aforementioned embodiments of the invention can be efficiently used in any application that requires multi-dimensional filtering implementation.

Embodiments of the invention may be implemented on an integrated circuit (IC), for example, by constructing arithmetic unit 130, input registers 110, coefficient register 120 and output register 140, as well as other components of FIGS. 1 and 6 in an integrated chip or as a part of an chip, such as application-specific integrated circuit (ASIC), a field-programmable gate array (FPGA), a central processing unit (CPU), a digital signal processor (DSP), a microprocessor, a controller, a chip, a microchip, etc.

According to embodiments of the present invention, some units e.g., arithmetic unit 130, input registers 110, coefficient register 120 and output register 140, as well as the other components of FIG. 1, may be implemented in a hardware description language (HDL) design, written in VHSIC hardware description language (VHDL), VERILOG®, or any other hardware description language. The HDL design may be synthesized using any synthesis engine such as SYNOPSYS® Design Compiler 2000.05 (DC00), BUILDGATES® available from, inter alia, Cadence Design Systems, Inc. An ASIC or other integrated circuit may be fabricated using the HDL design. The HDL design may be synthesized into a logic level representation, and then reduced to a physical device using compilation, layout and fabrication techniques, as known in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A processor comprising:
a plurality of input registers, each for storing an input vector containing data elements;
a coefficient register for storing a coefficient vector containing N coefficients;
an output register for storing a result vector; and
an arithmetic unit;
wherein the processor is configured to divide a two-dimensional filter into a plurality of patterns, each pattern for selecting N data elements from the plurality of input registers, wherein a first pattern of the plurality of patterns comprises a bit mask comprising a plurality of bits, wherein each bit of a first portion of the plurality of bits corresponds to a data element from a first input register of the plurality of input registers, and each bit of a second portion of the plurality of bits corresponds to a data element from a second input register of the plurality of input registers, wherein a value of each bit of the plurality of bits indicates if a corresponding data element is included in the first pattern or not, and wherein the arithmetic unit is configured to repeat the following for each of the plurality of patterns:

receive a pattern from the plurality of patterns;

select a plurality of groups of N data elements from the plurality of input registers in parallel, wherein each group is selected in accordance with the received pattern, and wherein each group is shifted with respect to another selected group;

perform a calculation comprising an arithmetic operation between each of the selected groups and the coefficients in parallel; and store results of the calculation in the output register.

2. The processor of claim 1, wherein the arithmetic unit comprises a plurality of blocks, wherein each block is adapted to perform the arithmetic operation between one of the selected groups and the coefficients, wherein each block comprises: N multipliers configured to multiply each one of the N data elements by a corresponding coefficient; circuitry configured to sum results of the multipliers to produce a sum; and an additional adder configured to add a stored result of the calculation with the sum.

3. The processor of claim 1, wherein N is equal to or larger than 4.

4. The processor of claim 1, wherein the arithmetic operation is selected from the list consisting of: multiplication, absolute difference and subtraction.

5. The processor of claim 1, wherein the processor is configured to receive the received pattern, the input vectors and the coefficients from a dedicated instruction.

6. A method for performing sliding window operation by a processor, the method comprising:

dividing a filter into a plurality of patterns, each pattern for selecting N data elements from a plurality of input vectors stored in a plurality of input registers, wherein a first pattern of the plurality of patterns comprises a bit mask comprising a plurality of bits, wherein each bit of a first portion of the plurality of bits corresponds to a data element from a first input register of the plurality of input registers, and each bit of a second portion of the plurality of bits corresponds to a data element from a second input register of the plurality of input registers, wherein a value of each bit of the plurality of bits indicates if a corresponding data element is included in the first pattern or not; and repeating the following steps for each of the plurality of patterns:

(a) obtaining a pattern from the plurality of patterns;

(b) selecting a plurality of groups of N data elements from the plurality of input registers in parallel, wherein each group is selected in accordance with the obtained pattern, and wherein each group is shifted with respect to each other;

(c) performing a calculation comprising an arithmetic operation between each of the selected groups and a plurality of coefficients in parallel; and (d) storing results of the calculation in an output register.

7. The method of claim 6, wherein the filter is a two-dimensional filter.

8. The method of claim 6, wherein null coefficients of the filter are not included in the plurality of patterns.

9. The method of claim 6, wherein the filter is a multi-dimensional filter.

10. The method of claim 6, wherein performing the arithmetic operation comprises:

multiplying each one of the N data elements by a corresponding coefficient;

summing results of the multiplication; and adding a stored result of the calculation to the sum.

11. The method of claim 6, wherein N equals 4.

12. The method of claim 6, wherein the arithmetic operation is selected from the list consisting of: multiplication, absolute difference and subtraction.

13. The method of claim 6, comprising receiving a dedicated instruction, the dedicated instruction providing the a pattern, the input vectors and the coefficients.

14. A system comprising:

a program memory; and a processor configured to:

divide a two-dimensional filter into a plurality of patterns, each pattern for selecting N data elements from a plurality of input registers, each for storing an input vector containing data elements wherein a first pattern of the plurality of patterns comprises a bit mask comprising a plurality of bits, wherein each bit of a first portion of the plurality of bits corresponds to a data element from a first input register of the plurality of input registers, and each bit of a second portion of the plurality of bits corresponds to a data element from a second input register of the plurality of input registers, wherein a value of each bit of the plurality of bits indicates if a corresponding data element is included in the first pattern or not; and repeat the following for each of the plurality of patterns:

receive from the program memory an instruction to execute a configurable sliding window operation, the instruction including a coefficient vector containing N coefficients, the plurality of input vectors containing data elements, and a received pattern of the plurality of patterns, the processor comprising an arithmetic unit configured to execute the instruction by:

receiving the received pattern;

storing the plurality of input vectors in the plurality of input registers;

selecting a plurality of groups of N data elements from the plurality of input registers in parallel, wherein each group is selected in accordance with the received pattern, and wherein each group is shifted with respect to another selected group;

performing a calculation comprising an arithmetic operation between each of the selected groups and the coefficients in parallel; and returning results of the calculation to an output register.

15. The system of claim 14, wherein the arithmetic unit comprises a plurality of blocks, wherein each block is adapted to perform the arithmetic operation between one of the selected groups and the coefficients, wherein each block comprises:

N multipliers configured to multiply each one of the N data elements by a corresponding coefficient;

circuitry configured to sum results of the multipliers; and
an additional adder configured to add a stored result of the calculation with the sum.

16. The system of claim 14, wherein N is equal to or larger than 4.

17. The system of claim 14, wherein the arithmetic operation is selected from the list consisting of: multiplication, absolute difference and subtraction.

\* \* \* \* \*